Oct. 13, 1959  C. A. WILMS ET AL  2,908,305
PITTING TOOL
Filed Nov. 9, 1956

Inventors
Carl A. Wilms
Donald K. Jewell
by Parker & Carter
Attorneys

2,908,305
PITTING TOOL

Carl A. Wilms, Park Ridge, and Donald K. Jewell, Grayslake, Ill., assignors to John W. Leslie, Chicago, Ill.

Application November 9, 1956, Serial No. 621,433

6 Claims. (Cl. 146—17)

This invention relates to a mechanism and a method for pitting fruit. It has for one object to provide a machine and a method for removing pits from dates.

Another object is to provide a method and machine for removing pits from other fruits.

Another object is generally to provide a means for treating agricultural products by the removal of pits, seeds, stems, cores and other parts of the agricultural products which it is desired to dispose of with a minimum of damage to the remainder of the products.

Other objects will appear from time to time throughout the specification and claims.

The invention is illustrated more or less diagrammatically in the accompanying drawings wherein.

Like parts are designated by like characters throughout the specification and drawings.

Figure 1:
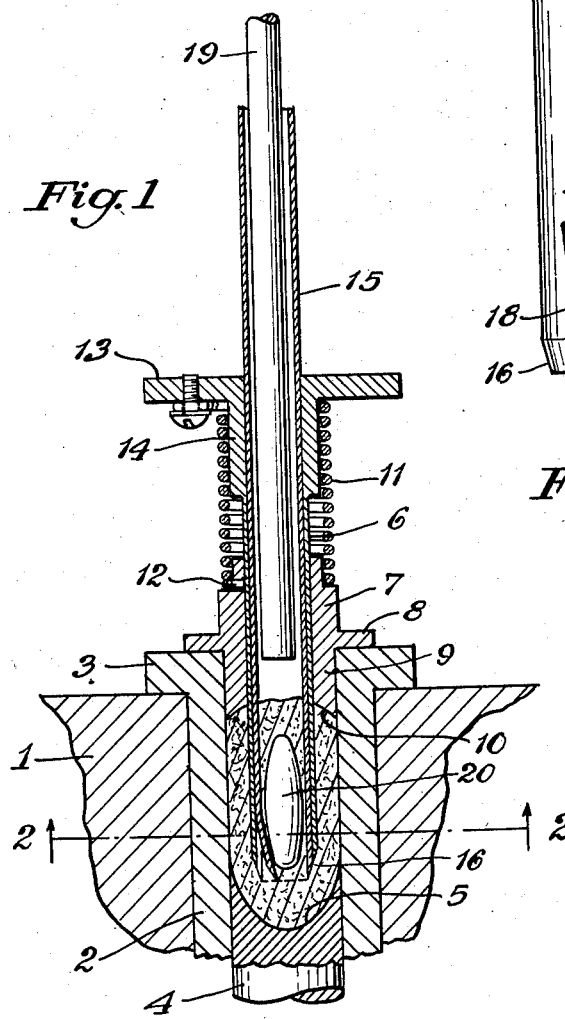
Fig. 1 is a section view showing one form of the device with parts in elevation, the device being in the cutting position.
Figure 3:
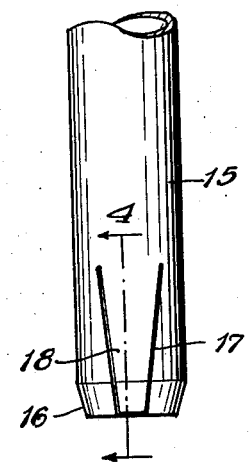
Fig. 3 shows the extractor tube in elevation.

In the particular form shown the device comprises a holder for the article to be pitted or otherwise treated. It provides an extracting tube or member, a holding tube and a pit-discharge rod. The invention comprises generally other mechanisms and parts because the pit-extracting tube and the stripping tube are given reciprocating movement and the extractor tube is additionally given rotary movement. These movements may be imparted to the parts by hand or by a variety of mechanisms. It will be convenient to describe the parts as they are shown particularly adapted for the pitting of dates. It is to be understood throughout, however, that reference to dates does not comprise narrowing language and that dates are referred to only as typical of the products which may be treated by the mechanisms and methods shown and described.

1 is a foundation member which may include a working table or plate stationary or movable. 2 is a date holder which is shown as generally tubular and provided with an upper flange 3 by means of which its movement into the member 1 is limited. 4 is a receiving member positioned within the tubular portion of the member 2. It is preferably shaped more or less to correspond to the shape of the date. It is thus provided with a rounded depression 5.

Mounted for reciprocation is a stripper tube 6 which is received in a hold-down sleeve 7. The sleeve 7 has a laterally extending flange 8 which may bear upon the flange 3 of the date holder. The sleeve 7 extends downwardly beyond the flange 8, as at 9, and may be provided with a concave surface 10 which corresponds generally to the shape of the article which is to be treated. The stripper 6 is not rotated and the sleeve 7 and flange 8 also are not rotated. A stripper spring 11 is positioned about the stripper. At one end 12 it engages a perforation formed in the hold-down sleeve 7. At the other end it is attached by a screw, or otherwise, to the flange 13 which is preferably formed integrally with the article hold-down tube 14. The parts 13 and 14 are not rotated.

Figure 4:
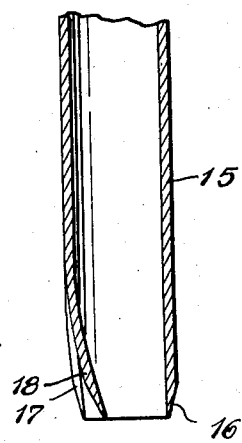
Fig. 4 is a longitudinal section of the extractor tube taken at line 4—4 of Fig. 3.

Positioned within the stripper tube 6 is a pit-extracting tube 15. This tube is mounted for reciprocation and for rotation. It is provided with a sharp lower edge 16 and may be slotted as at 17, 17 to provide a tongue 18 which has some resiliency and is inwardly bent as shown in Figs. 1 and 4.

A pit discharge rod 19 is mounted within the stripper tube 6 and the extractor tube 15.

As shown in Fig. 1, the stripper and extractor tubes 6 and 15 are at the lower limit of their excursion. Both tubes have pierced the date to the point necessary to engage the pit 20 and the resilient tongue 18 after having been pushed outwardly while passing the pit 20 has moved inwardly again to engage the pit and to hold it during separation of the pit from the pulp.

Figure 2:
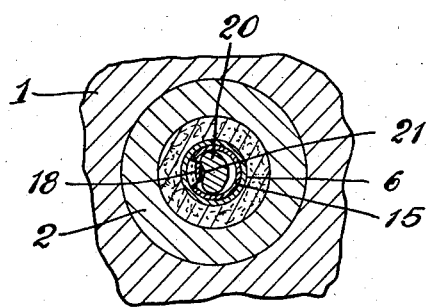
Fig. 2 is a transverse section taken at line 2—2 of Fig. 1.

In Fig. 2 the parts are in the position shown in Fig. 1. Date pits have a longitudinal groove or groovelike formation 21 on one side. When the stripper tube and the extractor tube are initially inserted the resilient tongue 18 will be aligned with the slot 21 only by accident. Generally it will not be so aligned. However, as the extractor tube is rotated the tongue 18 will be moved about the pit until it slips into the groove 21. Thereafter further rotation of the tube 15 carries the pit with it and so separates the pit from the pulp and makes its removal certain with a minimum of damage to the pulp.

Although an operative form of the device has been shown, the invention is not limited to the particular details shown. Many changes may be made in the form, shape and arrangement of parts without departing from the spirit of the invention.

The use and operation of the invention are as follows:

The particular details of the operating mechanism by means of which the stripper tube or stripper, the extractor tube and the pit-discharge rod are given the movements which are necessary to carry out their functions is not an essential part of the invention. Each moving part may be moved by hand. In general the stripper assembly, the pit extractor tube and the discharge rod will be raised sufficiently to permit the insertion of a date or other article to be treated into position within the member 2 and resting within the cavity 5. When the date is in position the stripper and pit extractor are moved into the space within the tubular portion 2 of the holder, the stripping tube and extractor tube moving preferably together and moving into the body of the date. The pit 20 is received within the interior of the two tubes just mentioned and is severed from the remainder of the body of the pulp of the date.

After the parts have moved to the position of Fig. 1 the extractor tube is rotated while the stripper remains stationary. The effect of this is to hold the body of the pulp against rotation and to cause rotation of the pit and that portion of the pulp which has been engaged within the extractor tube. This rotation completely severs the pit from the pulp and a minimum of damage occurs to the remainder of the pulp.

When the severance of the pit from the pulp of the date has been accomplished by rotation of the extractor tube, the tube is withdrawn, carrying the pit in it, and the tube may be moved to a point where it is convenient to discharge the pit. This discharge is accomplished by moving the discharge rod downwardly within the extractor tube and thus ejecting the pit.

The stripper tube 6 may, if desired, be moved upwardly at the same time that the extractor tube is moved upwardly or it may be moved later. The stripper tube may carry the date upwardly with it and move it to a point of discharge. However, it is sometimes convenient to make the member 4 reciprocable and if the date does not move upwardly when the stripper tube is raised, the member 4 may be raised to eject the date. The member 4 may, of course, move upwardly with the stripper tube.

Whatever the precise details of the movement of the stripper tube and the extractor tube, and whether they be moved manually or by mechanical means, the operation, in some respects, is always the same. Thus the stripper tube is stationary within the body of the pulp after it has been inserted and the extractor tube is rotated after it has been inserted to engage the pit and to separate the pit from the pulp. Thereafter the now severed pit is withdrawn from the pulp by movement of the extractor tube. Finally, the pit is ejected by relative movement of the discharge rod and the extractor tube and the body of the pulp is removed by movement of the stripper tube or by movement of the member 4 or by movement of the stripper tube and the member 4.

The device of this invention comprises a tool for pitting dates. Obviously it may be used for the removal of seeds, stems, cores, and the like from other articles. In its particular form, however, it is primarily adapted for use in pitting dates. It may be operated and its parts moved, as described, by many different types of mechanisms.

We claim:

1. In combination in a date pitting mechanism a date-receiving member and date pitting parts including a stripper member and an extractor member positioned within said stripper member, said stripper member and said extractor being mounted to move into a date to surround its pit, said extractor being mounted for rotation, said extractor member having an inwardly bent flexible member adapted to yield to pass over the pit and biased to fit the date pit closely.

2. In combination in a date pitting mechanism a date-receiving member and date pitting parts including a tubular stripper member and a tubular extractor member positioned within said stripper member, said stripper member and said extractor being mounted to move into a date to surround its pit, said extractor being mounted for rotation, said stripper member remaining stationary during rotation of said extractor, said extractor member having an inwardly bent flexible tongue member adapted to yield to pass over the pit and biased to fit the date pit closely.

3. In combination, a tubular stripper member and a pit extractor positioned within said stripper member, a discharge rod positioned within said extractor, a date holder, the stripper member and the extractor being mounted to move into the date-receiving holder and into the date to surround the pit, said extractor member having an integral inwardly bent flexible tongue member adapted to yield to pass over the pit and biased to fit the date pit closely, said extractor tube being mounted for rotation.

4. In combination for use as a date-pitting means a tubular stripper member and a concentric pit extractor positioned within and in contact with said stripper member, a discharge rod positioned within said extractor, a date holder, a movably mounted ejector member positioned within said date holder and adapted to comprise the bottom of said date holder, said ejector being mounted to move longitudinally with respect to the holder to eject the date, the stripper member and the extractor being mounted to move into the date-receiving holder and into the date to surround the pit, said extractor member having an integral inwardly bent flexible tongue member adapted to yield to pass over the pit and biased to fit the date pit closely, said extractor tube being mounted for rotation independently of said stripper member.

5. In combination in a date pitting machine, a member shaped to receive a date, a tubular stripper member adapted to be thrust into the date in position to surround its pit, a pit-extracting tube member mounted within said stripper member, said extractor adapted to be moved with said stripper member into the date in position to surround its pit, said extractor member having an integral inwardly bent flexible tongue member adapted to yield to pass over the pit and biased to fit the date pit closely.

6. In combination in a date pitting machine, a member shaped to receive a date, said member comprising a cylinder and a date-ejecting means movably positioned within said cylinder and comprising the bottom of the date-receiving compartment and mounted to be moved outwardly to eject the date, a tubular stripper member adapted to be thrust into the date in position to surround its pit, a pit-extracting tube member mounted within said stripper member, said extractor adapted to be moved with said stripper member into the date in position to surround its pit, said extractor member having an integral inwardly bent flexible tongue member adapted to yield to pass over the pit and biased inwardly to fit the date pit closely, and a discharge member positioned within said extractor and said stripper member and adapted, upon relative longitudinal movement, to eject the pit from the extractor.

References Cited in the file of this patent

UNITED STATES PATENTS

| | | |
|---|---|---|
| 666,701 | Scheidler et al. | Jan. 29, 1901 |
| 1,152,441 | Schlothan | Sept. 7, 1915 |
| 1,485,681 | Lake | Mar. 4, 1924 |
| 2,114,425 | Kagley | Apr. 19, 1938 |
| 2,433,125 | Kane | Dec. 23, 1947 |
| 2,475,142 | Kane | July 5, 1949 |
| 2,818,098 | Perrelli | Dec. 31, 1957 |